(12) United States Patent  (10) Patent No.: US 7,544,084 B1
Dutton et al.  (45) Date of Patent: Jun. 9, 2009

(54) CONNECTOR INCLUDING HOUSING SHELLS SECURED TOGETHER

(75) Inventors: Peter J. Dutton, Fremont, CA (US); Thomas D. Ratzlaff, Newark, CA (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 12/257,166

(22) Filed: Oct. 23, 2008

(51) Int. Cl.
    *H01R 13/58* (2006.01)
(52) U.S. Cl. ..................................... 439/465
(58) Field of Classification Search ............... 439/660, 439/402, 701, 608, 465, 495, 460
    See application file for complete search history.

(56) References Cited

U.S. PATENT DOCUMENTS

| | | | |
|---|---|---|---|
| 4,764,130 A | 8/1988 | DiClemente | |
| 4,960,387 A | 10/1990 | Davis et al. | |
| 5,244,415 A | 9/1993 | Marsilio et al. | |
| 5,282,757 A | 2/1994 | Maeda | |
| 5,431,577 A | 7/1995 | Lincoln | |
| 5,613,881 A | 3/1997 | Ichida et al. | |
| 5,890,931 A | 4/1999 | Ittah et al. | |
| 6,247,978 B1 | 6/2001 | Wu | |
| 6,354,878 B1 * | 3/2002 | Kropa et al. | 439/610 |
| 6,416,346 B1 | 7/2002 | Nakamura | |
| 6,478,631 B1 | 11/2002 | Dutton et al. | |
| 6,524,135 B1 * | 2/2003 | Feldman et al. | 439/610 |
| 6,840,789 B2 | 1/2005 | Shibata | |
| D523,399 S | 6/2006 | Sakamaki et al. | |
| 7,059,892 B1 * | 6/2006 | Trout | 439/465 |
| 7,137,848 B1 * | 11/2006 | Trout et al. | 439/465 |
| 7,300,317 B2 | 11/2007 | Dillon et al. | |
| 7,318,757 B1 * | 1/2008 | Minich | 439/701 |
| 2005/0118883 A1 * | 6/2005 | Kim | 439/701 |

\* cited by examiner

*Primary Examiner*—Neil Abrams
*Assistant Examiner*—Phuong Nguyen

(57) ABSTRACT

A connector including a pair of shells mated together along an interface that extends in a longitudinal direction. The pair of shells form a passage therebetween for conveying an electrical current and/or optical communication therethrough. Each shell includes an outer surface and a side projection that extends along the outer surface in substantially the longitudinal direction. The side projection has a ledge that projects from the outer surface and faces away from the interface. The connector also includes a coupling component that is configured to move along the shells in the longitudinal direction and engage the side projections. The coupling component has a slot configured to receive both side projections therein and is at least partially defined by a slot edge. The slot edge engages each ledge when the coupling component is moved over the side projections. The slot edge presses the side projections toward each other to secure the shells together.

20 Claims, 7 Drawing Sheets

CONNECTOR INCLUDING HOUSING SHELLS SECURED TOGETHER

CROSS-REFERENCES TO RELATED APPLICATION

The present application includes subject matter related to subject matter disclosed in patent applications having application Ser. Nos. 12/257,107, 12/257,132, and 12/257,187 which were filed contemporaneously with this application, which are all incorporated by reference in their entirety.

BACKGROUND OF THE INVENTION

The subject matter herein relates generally to connectors for holding electrical conductors and/or optical fibers, and more particularly, to connectors having housings constructed from multiple components.

Connectors provide interfaces between electrical and/or optical components where power and/or signals may be transmitted therebetween. Typically, a connector has an outer housing that surrounds a passage that retains one or more contact modules. The contact modules may provide a mechanism for retaining conduits such as, but not limited to, electrical conductors or optical fibers. The outer housing provides mechanical properties for means of connection and/or mounting, environmental protection and/or electrical shielding or grounding for the conductors or optical fibers. In addition to the passage, the connector may have other internal features or components that are confined within the housing and not accessible during ordinary usage of the connector. However, the internal features or components may be difficult to manufacture and/or may be inaccessible when the connector is constructed as a single component.

In one conventional connector, the housing is constructed from two half shells that are secured or joined together. The shells form a passage that extends therebetween and that is configured for holding one or more contact modules that are inserted into a completed shell housing. Each half shell includes an alignment feature that aligns with a corresponding alignment feature from the other half shell. This alignment feature may provide a means of attachment so that the half shells may be permanently fastened together. Although the conventional connector allows access to internal features of the housing before the connector is constructed, once the half shells are permanently riveted together, access to the internal features may be limited.

Accordingly, there is a need for connectors having a housing constructed from multiple shells where the shells may be removably coupled to each other. Furthermore, there is a need for connectors where the housing may be disassembled after construction to allow access to internal features of the housing. There is also a need for alternative connectors constructed from shells and for alternative mechanisms and methods for coupling the shells together.

BRIEF DESCRIPTION OF THE INVENTION

In one embodiment, a connector is provided that includes a pair of shells mated together along an interface that extends in a longitudinal direction. The joined shells form a passage therebetween for conveying an electrical current and/or optical communication therethrough. Each shell includes an outer surface and a side projection that extends along the outer surface in substantially the longitudinal direction. The side projection has a ledge that projects from the outer surface and faces away from the interface. The connector also includes a coupling component that is configured to move along the shells in the longitudinal direction and engage the side projections. The coupling component has a slot configured to receive both side projections therein and is at least partially defined by a slot edge. The slot edge engages each ledge when the coupling component is moved over the side projections. The slot edge presses the side projections toward each other to secure the shells together.

Optionally, each ledge may project from the outer surface of the corresponding shell at an angle that is perpendicular to or less than perpendicular to the outer surface such that the ledge extends away from the interface. The side projections of both shells may be adjacent to each other along the interface when the shells are secured together. Also, the side projections may abut each other side-by-side along the interface when the shells are secured together. In addition, the coupling component may include a fastener hole that extends in a direction substantially parallel to the passage.

In another embodiment, a connector is provided that includes a pair of shells mated together along an interface. The joined shells form a passage therebetween for receiving and holding a conductor or optical fiber. Each shell has an outer surface and includes a ledge that extends along the interface and projects away from the outer surface. Each ledge is adjacent to and faces away from the other ledge and forms an angle with the corresponding outer surface that is less than ninety degrees. The connector also includes a coupling component that is configured to grip the ledges to secure the shells together. The coupling component has a component surface and a slot formed into the surface. The slot is defined by a slot edge that extends around a periphery of the slot and is shaped to hold the ledges against the slot edge. The slot edge simultaneously grips the ledges such that the shells are held together.

Optionally, the ledges of both shells may be longitudinally aligned with each other along the interface. Each shell may also have a side projection that includes the ledge. The side projections abut each other along the interface when the shells are secured together. Furthermore, the coupling component may include a front end and a back end with the slot extending substantially therebetween. The front end includes an opening to the slot. The ledges may then move through the opening and into the slot when the coupling component is moved along the outer surfaces of the shells to engage the ledges.

DETAILED DESCRIPTION OF THE INVENTION

Figure 1:
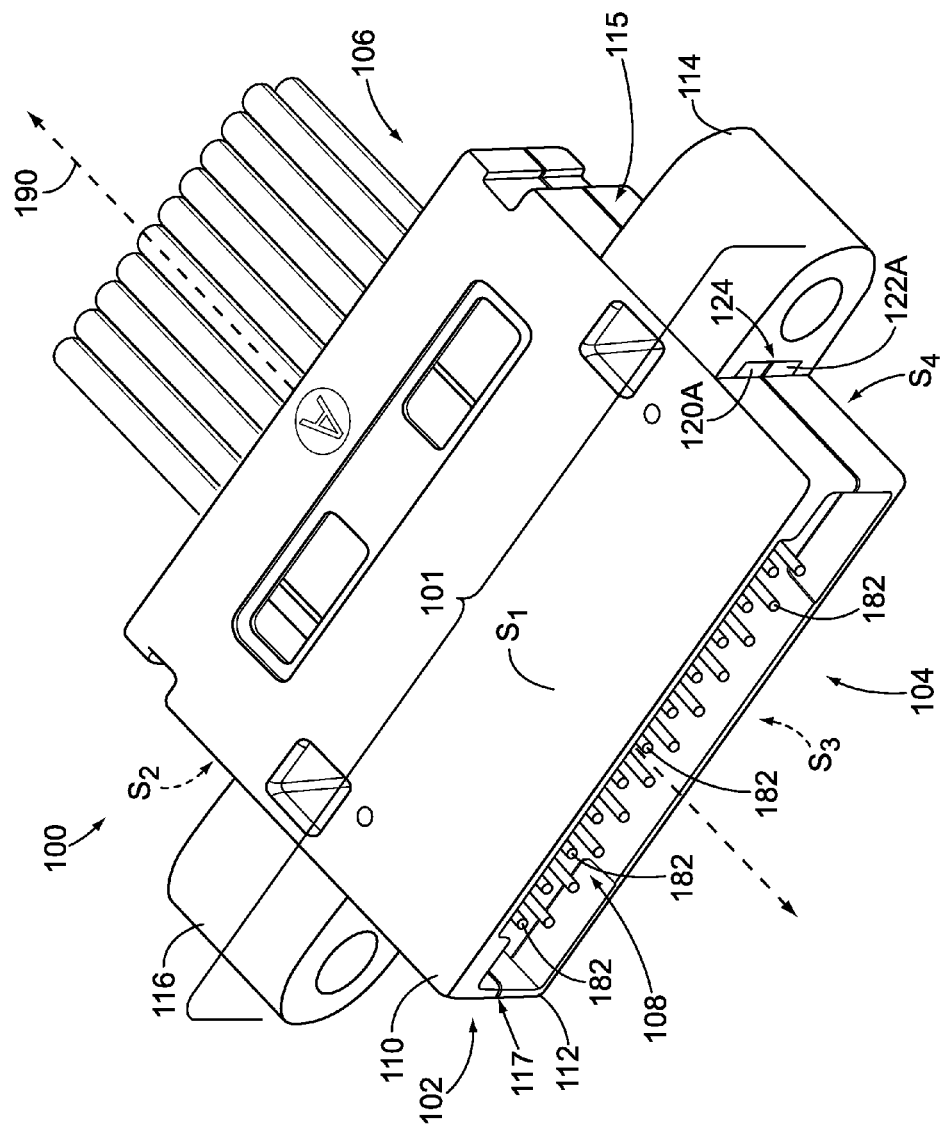
FIG. 1 is a front perspective view of a connector formed in accordance with one embodiment.

FIG. 1 is a front perspective view of a connector 100 formed in accordance with one embodiment. The connector 100 includes a connector housing assembly 101 having a main body 102 having a front end 104, a back end 106, and a passage 108 that extends therebetween along a central axis 190. The connector 100 may retain a contact module (not shown) that holds conductors and/or optical fibers 180 for conveying an electrical current and/or optical communication through the passage 108. The connector 100 may be a plug or receptacle that is configured to mate with a corresponding receptacle or plug (not shown) to establish an electrical and/or optical connection. For example, the passage 108 may hold mating contacts 182 proximate the front end 104 that are configured to be inserted into corresponding sockets (not shown) of another connector (not shown). The mating contacts 182 may be pin contacts, socket contacts, including electrical contacts and termini of optical fibers.

In addition, the connector 100 may be constructed from a variety of methods and may include various accessories attached thereto such as those described in the patent application having application Ser. No. 12/257,187, which is incorporated by reference in its entirety. Also, the connector 100 may be configured to prevent damaging the contacts when the connector 100 is mated with a complementary connector, such as the plug and receptacle connectors described in the patent application having application Ser. No. 12/157,107, which is incorporated by reference in its entirety. Also, the connector 100 may be configured to hold one or more contact modules as described in the patent application having application Ser. No. 12/257,132, which is incorporated by reference in its entirety.

As shown, the main body 102 is substantially rectangular and has a plurality of sides $S_1$-$S_4$ that are arranged about the central axis 190. As will be described in further detail below, the housing assembly 101 includes an upper housing shell 110 and a lower housing shell 112 that are mated together along interfaces 115 and 117 and form the main body 102. In the illustrated embodiment, the interfaces 115 and 117 extend along the passage 108 and parallel to the central axis 190. The upper shell 110 includes a pair of side projections 120A and 120B (shown in FIG. 6), and the lower shell 112 includes a pair of side projections 122A and 122B (shown in FIG. 6). As shown, the side projections 120A and 122A are positioned adjacent to each other and project away from the corresponding shells in a common direction, and the side projections 120B and 122B are positioned adjacent to each other and project away from the corresponding shells in a common direction. The housing assembly 101 also includes coupling components 114 and 116 that are attached to sides $S_4$ and $S_2$, respectively, of the main body 102. The coupling components 114 and 116 may engage the corresponding side projections and secure or hold the shells 110 and 112 together. More specifically, the coupling components 114 and 116 include slots 124 and 126 (shown in FIG. 4), respectively. In order to secure the shells 110 and 112 together, the coupling components 114 and 116 are moved along the sides $S_4$ and $S_2$, respectively, in a back-to-front direction parallel to the central axis 190 such that the slots 124 and 126 receive and slide over the corresponding adjacent side projections. The slots 124 and 126 grip the corresponding side projections thereby securing the shells 110 and 112 together.

Although the main body 102 shown in FIG. 1 is substantially rectangular, alternative embodiments may use other shapes and still use the features and mechanisms described herein. For example, the shells 110 and 112 may be semi-circular and include side projections that extend along the interface. The semi-circular shells may then be secured together by coupling components as described herein. As such, the following descriptions of parts, features, and mechanisms used with connector 100 are provided for illustrative purposes only, and are not intended to be limiting, and the illustrated embodiment is but one application that may be used with the features and mechanisms described herein.

Also, embodiments described herein may be configured for many applications, such as high-speed telecommunications equipment or ruggedized connectors. For instance, the connector 100 may perform at high speeds and maintain signal integrity while withstanding vibrations and shock that may be experienced during, for example, aerospace or military operations. As such, the connector 100 may be configured to satisfy known industry standards including military specifications, such as MIL-DTL-83513. However, embodiments described herein are not limited to applications for extreme environments, but may also be used in other environments, such as in an office or home.

Furthermore, although not shown, the connector 100 may also include one or more of additional components or accessories that are coupled to the main body 102. The accessories may be designed or configured for one or more functions including, but not limited to, conductor/cable strain relief, electrical shielding, electrical grounding, and/or environmental protection. In addition, the coupling components 114 and 116 may lock or form an interference fit with the shells 110 and 112 such that the shells 110 and 112 and the coupling components 114 and 116 form a unitary structure. As used herein, the term "unitary structure," means that the shells and the coupling components are directly attached to one another such that the multiple parts operate as a single unit or housing.

Figure 2:
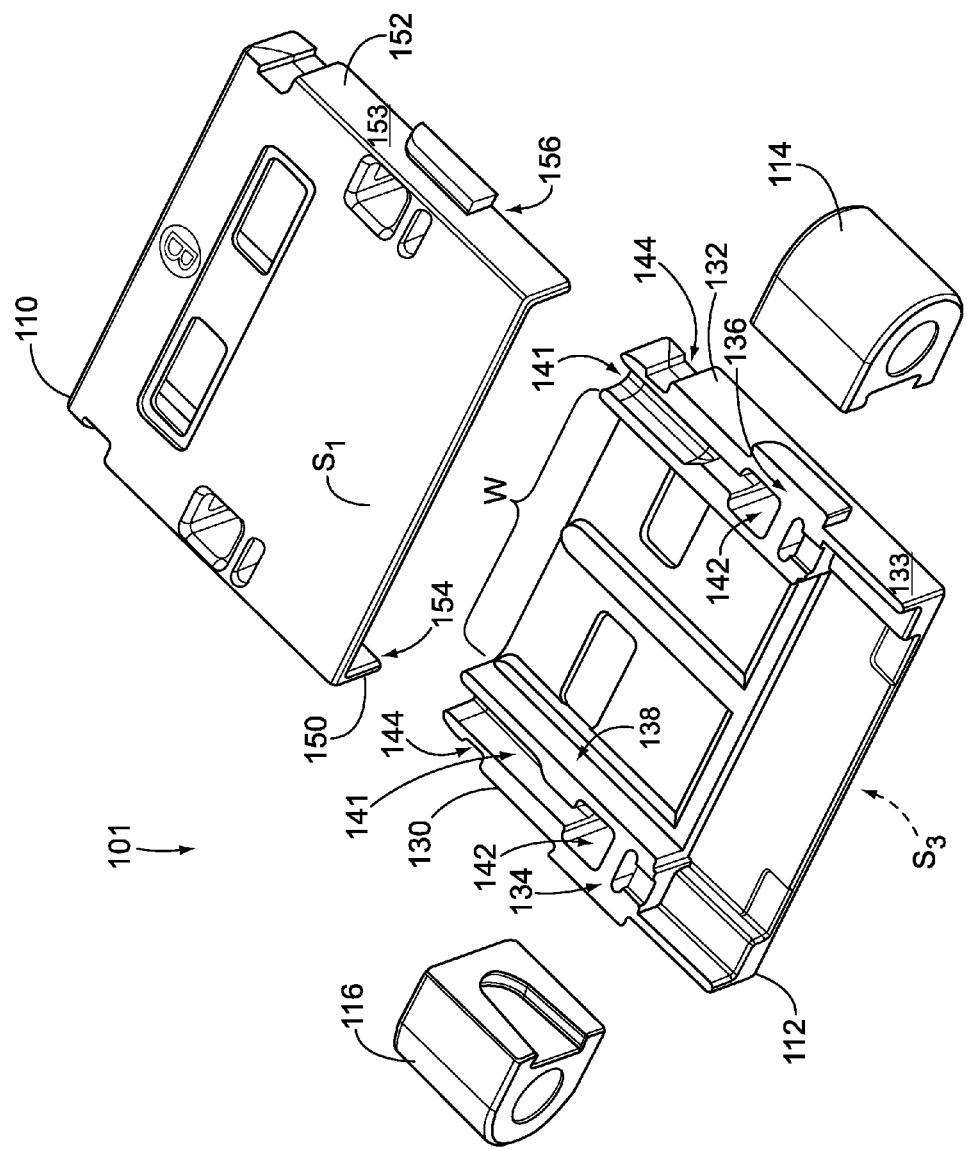
FIG. 2 is an exploded view of a housing assembly that may be used with the connector shown in FIG. 1.

FIG. 2 is an exploded view of the housing assembly 101. The shells 110 and 112 may be formed from a variety of materials, including metal, plastic, or a composite material. Furthermore, the shape and internal features (e.g., cavities, grooves, projections) of the shells 110 and 112 may be formed from casting, molding, or machining processes. As shown, the shell 112 includes a pair of opposing sidewalls 130 and 132 and the side $S_3$ that extends between the sidewalls 130 and 132. The sidewalls 130 and 132 may project away from the side $S_3$ in a common direction that is substantially perpendicular to the side $S_3$. The sidewalls 130 and 132 may also extend lengthwise parallel to the central axis 190 (FIG. 1). Each sidewall 130 and 132 includes an outer surface 131 (shown in FIG. 6) and 133, respectively, that faces away from the passage 108 (FIG. 1) when the connector 100 is constructed, and an inner surface 138 and 140 (shown in FIG. 6), respectively, that faces the passage 108. A width W of the passage 108 extends between the inner surfaces 138 and 140. The sidewalls 130 and 132 also include edge surfaces 134 and 136, respectively, that extend between the inner and outer surfaces of the corresponding sidewall.

When the shells 110 and 112 are not secured together by the coupling components 114 and 116, internal features of the shells 110 and 112 may be accessed. As such, the contact module (not shown) may hold the mating contacts 182 (FIG. 1) and the corresponding conductors 180 (FIG. 1) along the width W of the shell 112 (or shell 110) before the shells 110 and 112 are secured together. Alternatively, the shells 110 and 112 may be assembled and die insert may be installed subsequent to the assembly of the housing assembly 101. Also shown, the edge surfaces 134 and 136 or the sidewalls 130 and 132, respectively, may have one or more internal cavities 141 and 142 or outer grooves 144 that may be configured for a variety of purposes.

The shell 110 also has sidewalls 150 and 152 that project away from the side $S_1$ in a common direction that is substantially perpendicular to the side $S_1$. The sidewalls 150 and 152 include outer surfaces 151 (shown in FIG. 6) and 153, respectively, and edge surfaces 154 and 156, respectively, similar to the edge surfaces and outer surfaces described above with respect to the shell 112. The edge surfaces 154 and 156 may also have internal cavities and features (not shown). When the shells 110 and 112 are coupled together, the edge surface 134 of the shell 112 abuts against the edge surface 154 of the shell 110 such that the interface 117 is formed therebetween, and the edge surface 136 of the shell 112 abuts against the edge surface 156 of the shell 110 such that the interface 115 is formed therebetween.

Figure 3:
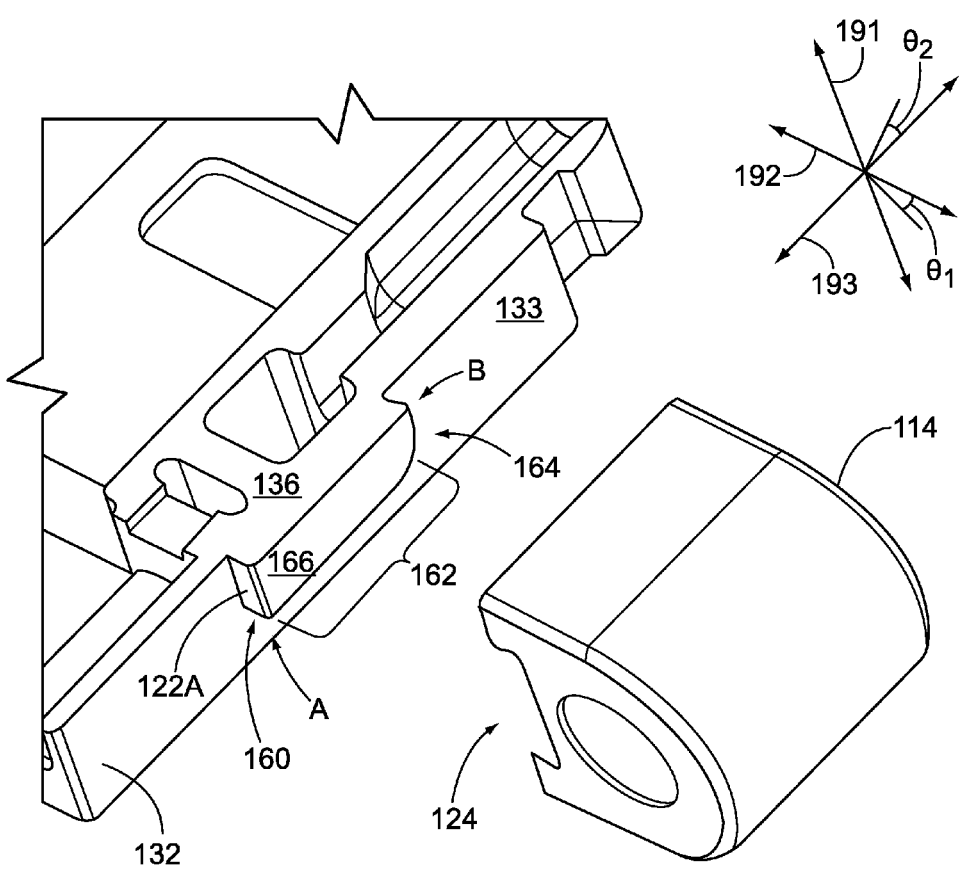
FIG. 3 is an enlarged perspective view of a sidewall and a coupling component shown in FIG. 2.

FIG. 3 is an enlarged perspective view of the sidewall 132 and the coupling component 114. The outer surface 133 of the sidewall 132 may be substantially planar and extend along a vertical plane formed by a longitudinal axis 193 and a vertical axis 191. (The longitudinal axis 193 may be parallel to the central axis 190 shown in FIG. 1.) The side projection 122A is configured to be inserted into and gripped by the slot 124 of the coupling component 114. For example, the side projection 122A may include a ledge 160 that projects away from the outer surface 133 in a direction that is perpendicular to or slightly less than perpendicular to the outer surface 133. The ledge 160 faces away from the interface 115 (FIG. 1) and may extend around and define at least a portion of an outer periphery of the side projection 122A. In the illustrated embodiment, the side projection 122A is at least partially defined by the edge surface 136. However, in alternative embodiments, the side projection 122A is spaced apart away from the edge surface 136 and includes a top ledge.

In the illustrated embodiment, the ledge 160 extends away from the outer surface 133 and the interface 115 at an angle $\theta_1$ with respect to the outer surface 133. The ledge 160 nay include an elongated portion 162 and a tapering portion 164. The elongated portion 162 extends substantially linearly and may extend at a slight angle $\theta_2$ toward the interface 115 in a front-to-back direction. In the illustrated embodiment, the elongated portion 162 extends into the tapering portion 164. The tapering portion 164, in turn, curves into the edge surface 136 of the side projection 122A. In one embodiment, the ledge 160 may substantially maintain the angle $\theta_1$ from a front point A of the ledge 160 to a rear point B where the ledge 160 intersects the edge surface 136. Also shown, the side projection 122A includes an outer projection surface 166. The projection surface 166 may be substantially planar and extend substantially parallel to the vertical plane formed by the outer surface 133. As such, the side projection 122A may have a substantially constant thickness between the outer surface 133 and the projection surface 166.

Also, the edge surface 136 may be substantially smooth and extend along a lateral plane formed by the axes 192 and 193. Alternatively, the edge surface 136 is not planar but is conformed to mate with the opposing edge surface 156 when the shells 110 and 112 are secured together.

Although the preceding description was specifically applied to the side projection 122A and edge surface 136, the description may be similarly applied to the side projections 120A (FIG. 1), 120B (FIG. 6), and 122B (FIG. 6) and the corresponding edge surfaces. However, the angles $\theta_1$ and $\theta_2$ may be adjusted so that the side projections 120A, 120B, and 122B may interact with the corresponding coupling components as described herein.

Figure 4:
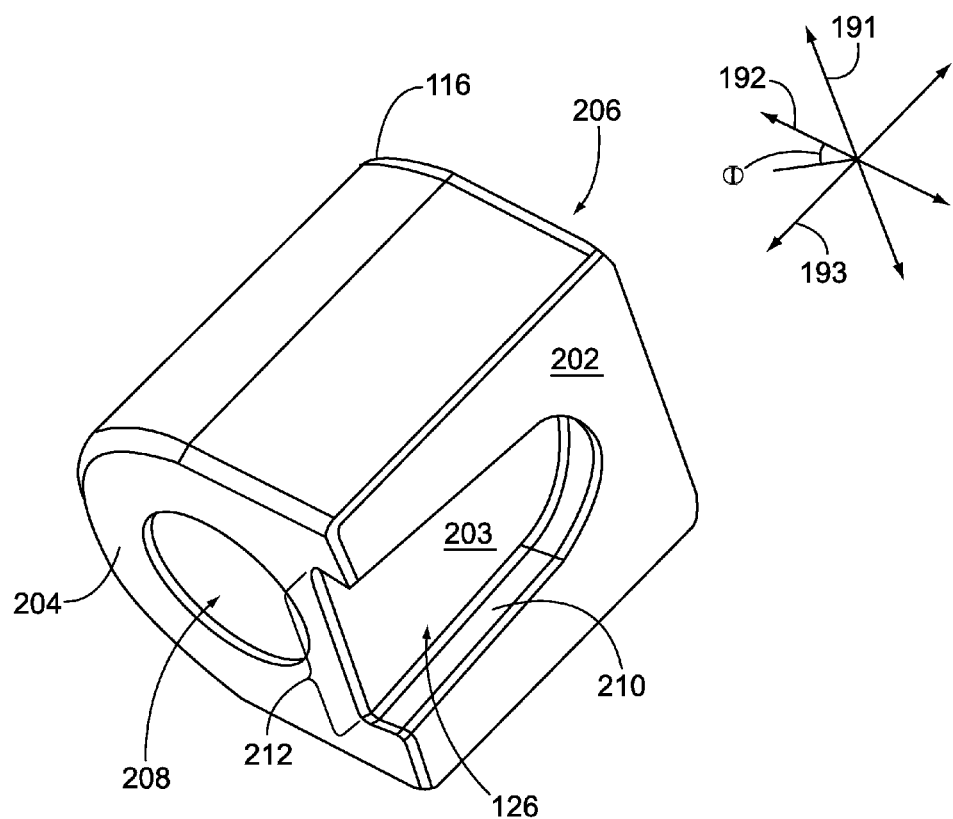
FIG. 4 is an isolated perspective view of another coupling component that may be used with the housing assembly shown in FIG. 2.

FIG. 4 is an isolated perspective view of the coupling component 116. Although the following is specifically applied to the coupling component 116, the description may be similarly applied to the coupling component 114 (FIG. 1) with some adjustments made so that the coupling components 114 and 116 may interact with the side projections as described herein. The coupling component 116 may include a forward-facing end 204, a rearward-facing end 206, and an inner component surface 202 that extends therebetween. In addition to securing the shells 110 and 112 (FIG. 1) together, the coupling component 116 may include a fastener hole 208 for receiving and engaging mounting and/or mating hardware (e.g., a screw or post). The fastener hole 208 may extend through the forward-facing end 204 toward the rearward-facing end 206 along the longitudinal axis 193. As such, when the coupling component 116 is engaged to another connector (not shown) through a fastener, the coupling component 116 is prevented from moving in a front-to-back direction.

The component surface 202 faces the outer surface 131 (FIG. 6) of the shell 112. In the illustrated embodiment, the component surface 202 is configured to slide along the outer surface 131 and may extend along the vertical plane defined by the axes 191 and 193. The coupling component 116 also includes the slot 126 formed within the component surface 202. The slot 126 includes a planar slot surface 203 and is defined by a slot edge 210 that extends a depth from the component surface 202 to the slot surface 203. In the illustrated embodiment, the slot edge 210 is configured to engage and grip the ledges 160 of the corresponding side projections 120B and 122B when the connector 100 is constructed. As such, the slot edge 210 extends from the component surface 202 toward the slot surface 203 at an angle $\Phi$ with respect to the planar component surface 202. The angle $\Phi$ complements the angle $\theta_1$ (FIG. 3) of the corresponding ledge 160. Also shown, the slot 126 may have a shape such as a taper or a parabolic shape that is configured to allow ease of assembly and to constrain shell components 110 and 112 into a fully assembled condition via the corresponding adjacent side projections 120B and 122B.

Furthermore, the slot 126 may also include an opening 212 through the forward-facing end 204. The opening 212 is shaped to receive the side projections 120B and 122B when the slot 126 is moved along the outer surface 131 of the shell 112. However, in alternative embodiments, the opening 212 may not be needed. For example, the slot 126 may be large enough such that the coupling component 116 may be placed over the side projections 120B and 122B and then slid from back-to-Front or front-to-back. Furthermore, the slot 126 may be configured to form a snap, interference fit with the side projections 120B and 122B by aligning the slot 126 with the side projections 120B and 122B and applying a lateral force to the coupling component 116 toward die outer surface 131.

Figure 5:
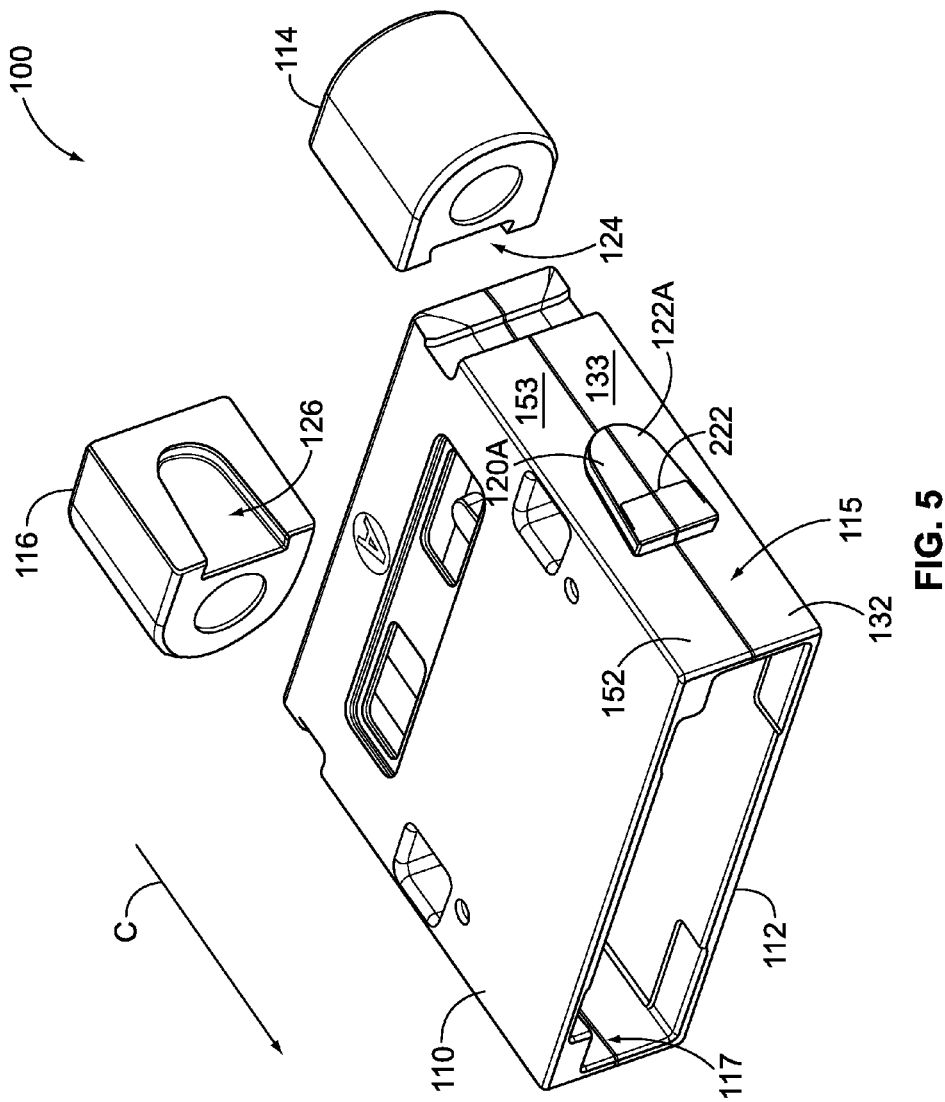
FIG. 5 is a front perspective view of the housing assembly shown in FIG. 2 before the coupling components are secured to a pair of shells.
Figure 6:
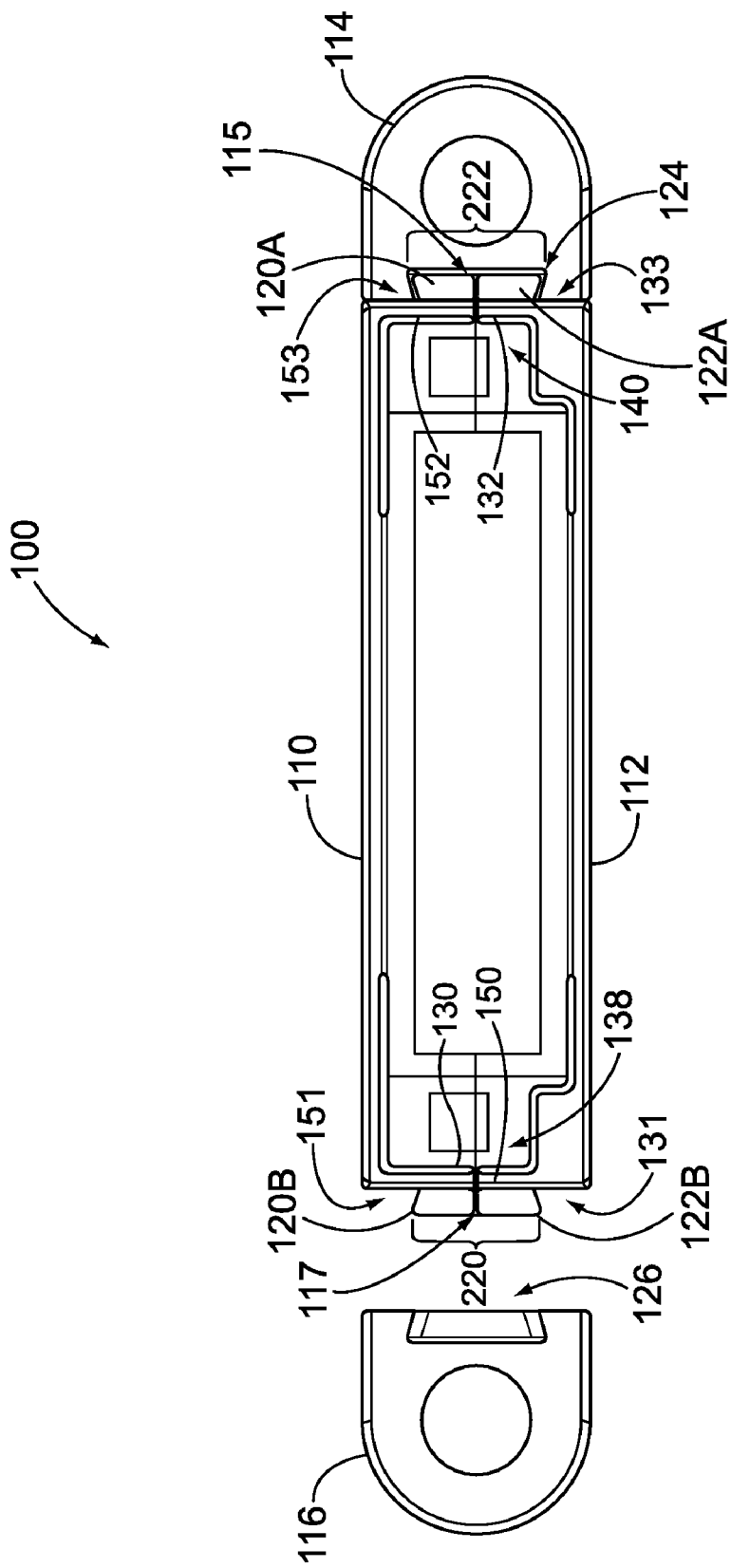
FIG. 6 is a front planar view of the housing assembly shown in FIG. 2.

FIGS. 5 and 6 illustrate the connector 100 at different stages of construction. (For illustrative purposes, the conductors 180 and the mating contacts 182 shown in FIG. 1 are not shown in FIGS. 5 and 6.) Specifically, FIG. 5 is a front perspective view of the connector 100 when the shells 110 and 112 are aligned against each other, and FIG. 6 is a front planar view of the connector 100 after the coupling component 114 has been engaged to the side $S_4$ (FIG. 1). As discussed above, before the shells 110 and 112 are mated together, other parts or components may be arranged or positioned within one or both of the shells 110 and 112. As shown in FIGS. 5 and 6, the shells 110 and 112 are aligned with each other and mated together along the interfaces 115 and 117. More specifically, the edge surfaces 134 and 154 (FIG. 2) abut each other along the interface 117, and the edge surfaces 136 and 156 (FIG. 2) abut each other along the interface 115. The interfaces 115 and 117 are co-planar in the illustrated embodiment. However, in alternative embodiments, the interfaces 115 and 117 may not be co-planar. Furthermore, in alternative embodiments, the edge surfaces may form protuberances or cavities where the protuberances project away from the corresponding edge surface and are inserted into a corresponding cavity of the other shell.

Also shown, the outer surfaces 133 and 153 of the sidewalls 132 and 152, respectively, form the side $S_4$ (FIG. 1) of the constructed connector 100, and the outer surfaces 131 and 151 (shown in FIG. 6) of the sidewalls 130 and 150, respectively, form the side $S_2$ (FIG. 1). As shown, the sides $S_2$ and $S_4$ may be substantially planar. Alternatively, the outer surfaces may meet each other an angle or point or the sides $S_2$ and $S_4$ may be slightly curved.

In the illustrated embodiment, when the shells 110 and 112 are aligned along the interfaces 115 and 117, the adjacent side projections 120A and 122A abut each other along the interface 117. The side projections 120A and 122A may be longitudinally aligned with each other such that the points A and B (FIG. 3) from one side projection are aligned with the corresponding points A and B of the other side projection. Furthermore, the adjacent side projections 120A and 122A may also be laterally aligned such that the corresponding projections surfaces 166 (FIG. 3) are flush with each other. As such, when the side projections 120A and 122A are both laterally and longitudinally aligned, the side projections 120A and 122A form a side knob 222. Likewise, the adjacent side projections 120B and 122B (FIG. 6) may abut each other along the corresponding interface 117 and be aligned with each other such that the side projections 120B and 122B form a side knob 220.

The knobs 220 and 222 are configured to be inserted into the corresponding slot 126 and 124, respectively, of the corresponding coupling components. As shown in FIG. 6, the knobs 220 and 222 have interlocking dovetailed shaped cross-sections. In an alternative embodiment, the knobs 220 and 222 may have interlocking T-shaped cross-sections. With reference to FIG. 5, to secure the shells 110 and 112 together, the coupling components 114 and 116 are moved along the central axis 190 (FIG. 1) in a back-to-front direction (indicated by the arrow C). More specifically, the component surfaces 202 (FIG. 4) of the corresponding coupling components 114 and 116 slide along the sides $S_4$ and $S_4$, respectively. The openings 212 of each slot 126 and 124 receive the corresponding knob 220 or 222, respectively. As or when the knobs 220 and 222 are fully inserted into the corresponding slot, the slot edge 210 engages the ledges 160 of the corresponding side projections. The slot edge 210 may form an interference fit with the ledges 160.

When in the fully inserted position as shown in FIG. 1, the coupling components 114 and 116 grip the corresponding side projections. As such, the coupling components 114 and 116 may not be pulled away from the sides $S_4$ and $S_2$, respectively. Furthermore, the shells 110 and 112 are secured together and may not be separated without removing the coupling components 114 and 116.

In one embodiment, the shells 110 and 112 are secured together without using additional fasteners or features. For example, the coupling components 114 and 116 and the shells 110 and 112 may be removably coupled such that the coupling components 114 and 116 may be removed and the shells 110 and 112 may be separated for servicing components internal to the connector housing assembly 101. In other embodiments, the shells 110 and 112 may be permanently affixed along the corresponding edge surfaces 134 and 136. In alternative embodiments, additional fasteners may be used to facilitate securing the shells 110 and 112 together.

In another embodiment, coupling components 114 and 116 may be temporarily or permanently retained by means such as, but not limited to, snap-fit mechanisms, press fits, adhesive bonds or welds.

Figure 7:
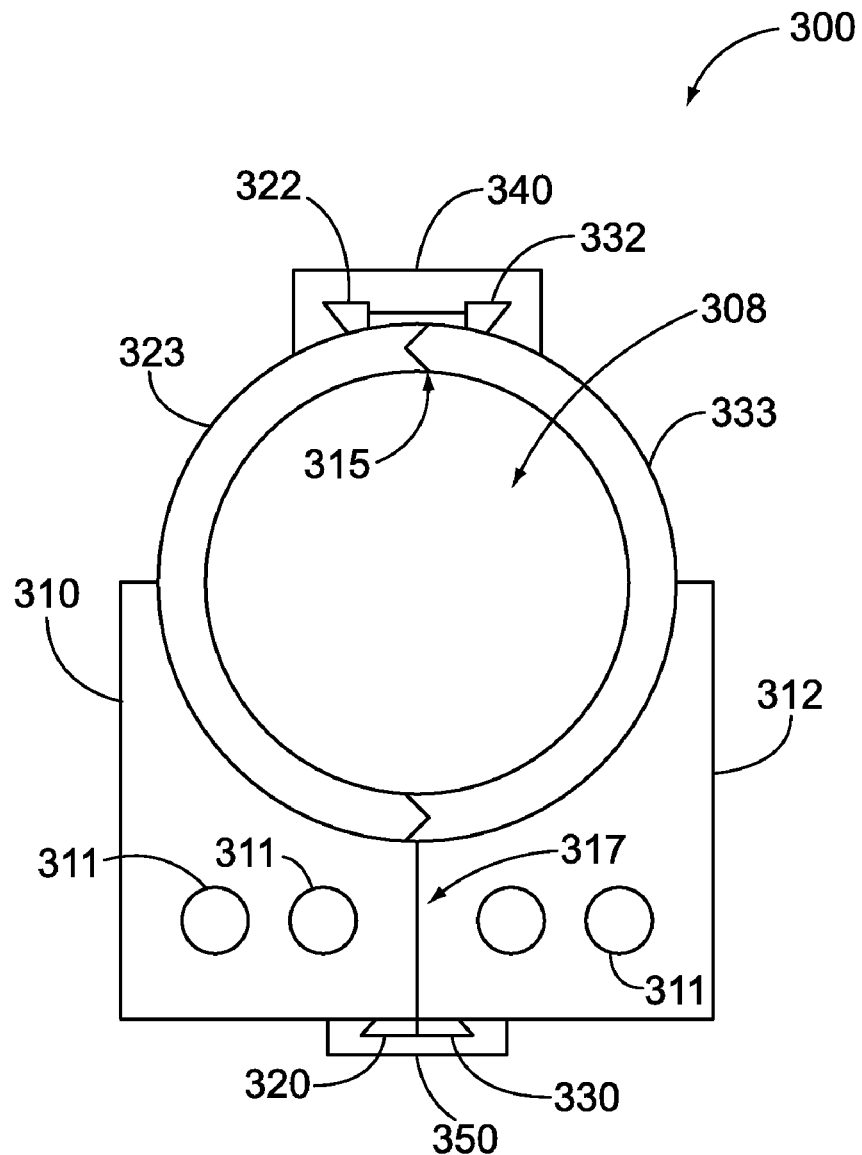
FIG. 7 is a front planar view of a connector formed in accordance with an alternative embodiment.

FIG. 7 is a front planar view of a connector 300 formed in accordance with an alternative embodiment. The connector 300 includes a pair of shells 310 and 312 that engage each other along interfaces 315 and 317. Similar to the connector 100 (FIG. 1) described in detail above, the connector 300 may be assembled and disassembled to arrange conductors and/or optical fibers (not shown) within a passage 308 formed between the shells 310 and 312 and to provide access to other internal features. The connector 300 may also include separate power contacts 311 that project from a front end of the connector 300. As shown, the shell 310 includes side projections 320 and 322, and the shell 312 includes side projections 330 and 332. When the shells 310 and 312 are mated together, the side projections 320 and 330 extend along and adjacent to each other and the side projections 322 and 332 extend along and adjacent to each other. However, the side projections 322 and 332 are spaced apart from each other while the side projections 320 and 330 abut each other along the interface. Also shown, the side projections 322 and 332 may extend from curved outer surfaces 323 and 333, respectively. To secure the shells 310 and 312 together, a coupling component 340 may engage the side projections 322 and 332 and a coupling component 350 may engage the side projections 320 and 330. The coupling components 340 and 350 may function in a similar manner as described above with respect to the coupling components 114 and 116.

In addition to providing alternative methods and mechanisms for securing shells together to form a housing assembly, embodiments described herein may provide connectors that allow access to internal features of the housing before the connector is constructed. Furthermore, embodiments described herein may provide connectors that may be disassembled after construction to allow access to internal features of the housing. Also, embodiments described herein may be configured to maintain integrity of connectivity while withstanding vibrations and shock that may be experienced during, for example, aerospace or military operations.

While the illustrated embodiment described above is designed for a specific orientation when mounted or mated with another connector, alternative embodiments may have other configurations. As such, the terms front, back (or rear), top, bottom, upper, lower, upward, downward, inward and the like are relative and based on the orientation of the illustrated embodiment, and are not intended to be restrictive.

Thus, it is to be understood that the above description is intended to be illustrative, and not restrictive. As such, the above-described embodiments (and/or aspects thereof) may be used in combination with each other. In addition, many modifications may be made to adapt a particular situation or material to the teachings of the invention without departing from its scope. For example, generally a "connector," as may be used in the following claims, may either be a plug connector or a receptacle connector or another type of connector. Furthermore, a "mating contact," includes pin contacts and socket contacts. Also, a mating contact may be an electrical contact or a terminus for an optical fiber.

Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. § 112, sixth paragraph, unless and until such claim limitations expressly use the phrase "means for" followed by a statement of function void of further structure.

What is claimed is:

1. A connector comprising:
   a pair of shells mated together along an interface extending in a longitudinal direction, the pair of shells forming a passage therebetween for receiving and holding a conductor or optical fiber, each shell including an outer surface and a side projection that extends along the outer surface in substantially the longitudinal direction, the side projection having a ledge that projects from the outer surface and faces away from the interface; and
   a coupling component configured to move along the shells in the longitudinal direction and engage the side projections, the coupling component having a slot configured to receive both side projections therein and being at least partially defined by a slot edge, wherein the slot edge engages each ledge when the coupling component is moved over the side projections, the slot edge pressing the side projections toward each other to secure the shells together.

2. The connector in accordance with claim 1 wherein each ledge projects from the outer surface of the shell at an angle that is perpendicular to or less than perpendicular to the outer surface such that the ledge extends away from the interface.

3. The connector in accordance with claim 1 wherein the side projections of both shells are adjacent to each other and extend along the interface when the shells are secured together.

4. The connector in accordance with claim 1 wherein the interface extends along a plane in the longitudinal direction.

5. The connector in accordance with claim 1 wherein the side projections abut each other along the interface when the shells are secured together.

6. The connector in accordance with claim 1 wherein the side projections have a cross-sectional dovetailed shape when the shells are secured together.

7. The connector in accordance with claim 1 wherein the side projection of each shell includes a pair of side projections and the coupling component includes a pair of coupling components, each coupling component configured to move along the shells in the longitudinal direction and engage one side projection from each pair of side projections.

8. The connector in accordance with claim 1 wherein the shells are permanently affixed to each other.

9. The connector in accordance with claim 1 wherein the shells are removably coupled together.

10. The connector in accordance with claim 1 wherein the coupling component includes a forward-facing end and a rearward-facing end with the slot extending substantially therebetween, the forward-facing end including an opening to the slot, wherein the side projections are inserted through the opening and into the slot when the coupling component is moved along the shells.

11. A connector comprising:
    a pair of shells mated together along an interface, the pair of shells forming a passage therebetween for receiving and holding a conductor or optical fiber, each shell having an outer surface and including a ledge that extends along the interface and projects away from the outer surface, each ledge being adjacent to and facing away from the other ledge and forming an angle with the corresponding outer surface that is less than ninety degrees; and
    a coupling component configured to grip the ledges to secure the shells together, the coupling component having a component surface and a slot formed therein, the slot being defined by a slot edge that extends around a periphery of the slot and being shaped to hold the ledges against the slot edge, wherein the slot edge simultaneously grips the ledges so that the shells are held together.

12. The connector in accordance with claim 11 wherein the ledges of both shells are longitudinally aligned with each other along the interface.

13. The connector in accordance with claim 11 wherein the interface extends along a longitudinal plane.

14. The connector in accordance with claim 11 wherein each shell further comprises a side projection that includes the ledge, the side projections abutting each other along the interface when the shells are secured together.

15. The connector in accordance with claim 11 wherein the ledges extend substantially parallel to the passage.

16. The connector in accordance with claim 11 wherein the coupling component includes a fastener hole that extends in a direction substantially parallel to the passage.

17. The connector in accordance with claim 11 wherein the coupling component includes a forward-facing end and a rearward-facing end with the slot extending substantially therebetween, the forward-facing end including an opening to the slot, wherein the ledges move through the opening and into the slot when the coupling component is moved along the outer surfaces of the shells to engage the ledges.

18. The connector in accordance with claim 11 wherein the ledge of each shell includes a pair of ledges and the coupling component includes a pair of coupling components, each coupling component being configured to grip adjacent ledges from the shells to secure the shells together.

19. The connector in accordance with claim 11 wherein the ledge includes an elongated portion that extends in a linear direction at a slight angle toward the interface.

20. The connector in accordance with claim 19 wherein the ledge further comprises a tapering portion that extends from the elongated portion, the tapering portion extending from the elongated portion to the interface and curving therebetween.

* * * * *